United States Patent [19]

Laan

[11] Patent Number: 4,698,366

[45] Date of Patent: Oct. 6, 1987

[54] METHOD FOR THE MANUFACTURE OF INSULATING POROUS SHAPED BUILDING ARTICLES

[75] Inventor: Dirk Laan, Amsterdam, Netherlands

[73] Assignee: Stichting IWL, Amsterdam, Netherlands

[21] Appl. No.: 787,804

[22] PCT Filed: Feb. 5, 1985

[86] PCT No.: PCT/NL85/00008

§ 371 Date: Dec. 2, 1985

§ 102(e) Date: Dec. 2, 1985

[87] PCT Pub. No.: WO85/03503

PCT Pub. Date: Aug. 15, 1985

[30] Foreign Application Priority Data

Feb. 9, 1984 [NL] Netherlands ............... 8400426

[51] Int. Cl.$^4$ .............................................. C08J 9/22
[52] U.S. Cl. .................................. 521/55; 521/54; 521/83; 521/84.1
[58] Field of Search ............ 521/54, 55, 83, 84.1

[56] References Cited

U.S. PATENT DOCUMENTS 3,272,765  9/1966  Sefton .......................... 521/55

FOREIGN PATENT DOCUMENTS 2374271  7/1978  France .
WO81/00104  1/1981  PCT Int'l Appl. .
1538689  1/1979  United Kingdom .

*Primary Examiner*—Morton Foelak
*Attorney, Agent, or Firm*—Schwartz, Jeffery, Schwaab, Mack, Blumenthal & Evans

[57] ABSTRACT

A method for the manufacture of insulating, porous, shaped articles, such as insulating plates, blocks and similar construction elements, wherein expanded plastic spheres are mixed with a binder, comprising a bituminous product, wherein at the end of that treatment an amount of granular or powdery material is added to the mixture until the mixture consist mainly of loose spheres again, subsequently cement is added and the mass thus obtained is subjected a to second compounding treatment with water being added, whereafter the mixture thus obtained is compress to the desired articles with between the first and second compounding action a proteinaceous foaming agent being. Added. The foaming agent is preferably added simultaneously with the water and in an amount of 0.4 to 5% by weight of the solid components of the final mixture.

8 Claims, 1 Drawing Figure

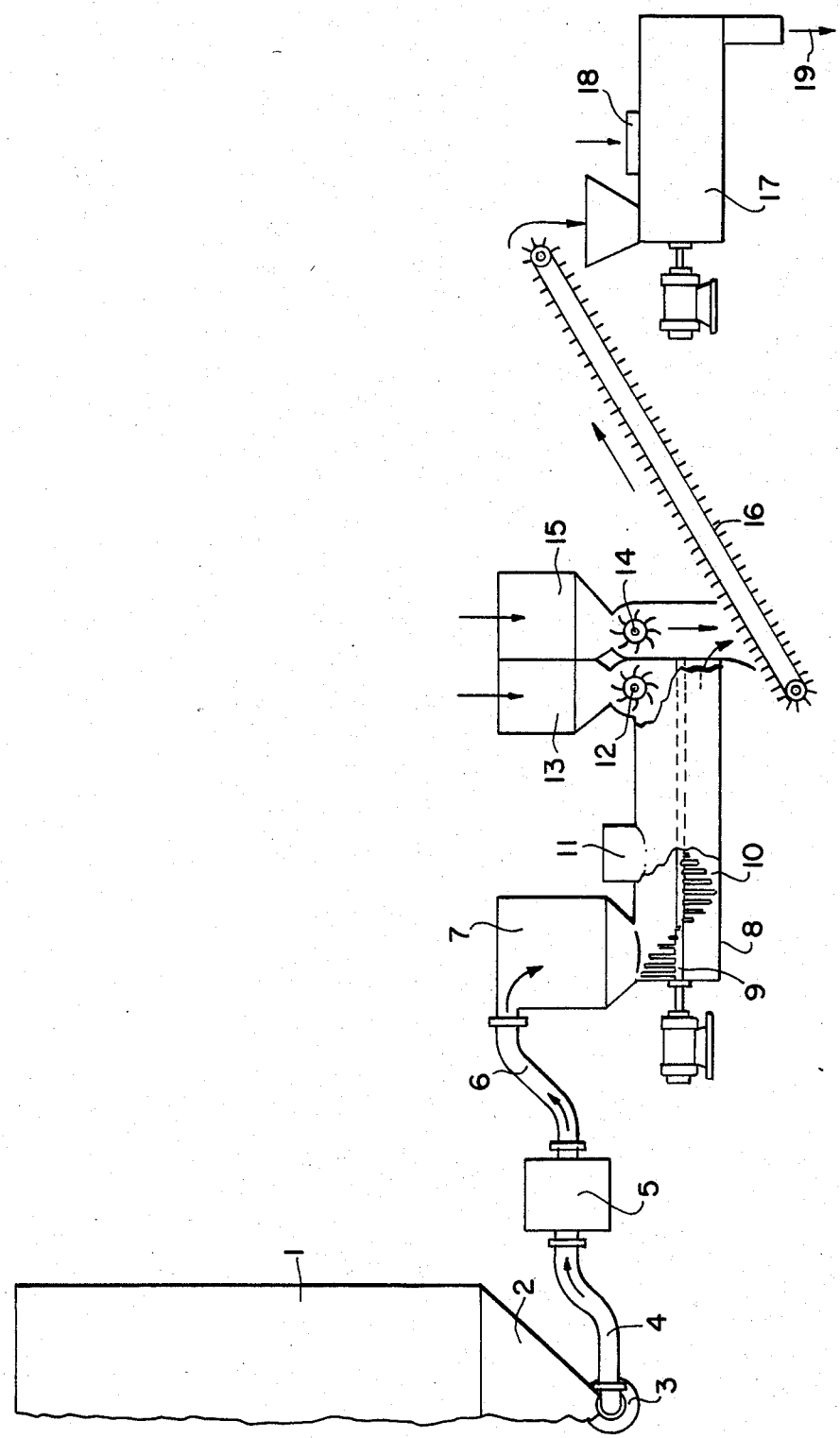

METHOD FOR THE MANUFACTURE OF INSULATING POROUS SHAPED BUILDING ARTICLES

BACKGROUND OF THE INVENTION

The invention relates to a method for the manufacture of insulating, porous, shaped articles and buildings, built with said shaped articles. In particular, the invention relates to a method for the manufacture of insulating, porous, shaped articles such as flat insulating plates, blocks or similar construction elements.

Known from Dutch Patent Application No. 7,113,658 is a method to manufacture porous, shaped articles using expanded plastic spheres, in particular polystyrene spheres, having a bituminous product as a binder between the plastic spheres and the cement, wherein these granules have to be incorporated. The shaped articles thus obtained have a low compressive strength, making them unsuitable for the construction of walls, wall elements and similar constructions therefrom without additional steps. Such a cellular concrete is on occasion also referred to as foamed concrete.

An improvement of said method is described in European Patent Specification No. 31,365, whereby the bituminous odour is avoided and the strength of the shaped article obtained, in particular, the compressive strength, is increased by using a mixture of a bituminous product and waterglass, wherein the waterglass may constitute up to 75% by weight of the mixture, as a binder. The products thus obtained are heat- and moisture resistant and exhibit good heat insulating properties.

SUMMARY OF THE INVENTION

The present invention has as an object to provide a further improvement of this known method, thus providing a product which not only has the advantages of the known products, but in addition can be nailed easily and can be machined with the customary hand tools, while optionally it is also possible to adjust the weight per unit of volume and consequently the compressive strength.

Thus, the invention provides a method for the manufacture of insulating, porous, shaped articles, such as flat insulating plates and insulating plates provided with channels, blocks and similar construction elements, wherein expanded foam plastic spheres are mixed with a binder, capable of causing adherence of the plastic foam to cement, and comprising a bituminous product, at the end of this treatment an amount of granular or powdery material being added to the mixture and compounded therewith until the mass in essence consists of loose spheres again, cement then being added to the mixture and the combination again being subjected to a second mixing operation with dosage of a quantity of water, and the eventual mixture thus obtained being compressed to the desired articles, which are then dried, a proteinaceous foaming agent being added to the spheres between the first and second mixing operation.

In the second step, supplements, such as sand, can optionally be added to the mixture, while said mixture may also be vibrated while compressing to the desired articles.

In this manner articles are obtained with a compressive strength amounting to at least 20 kg/cm$^2$ and preferably at least 40 kg/cm$^2$, depending on the amounts of starting material used and the manner of operation, whereas the articles are also very fire resistant. By suitable selection of the amounts of the starting materials a compressive strength is obtained, which is adequate for use of the articles as supporting elements in buildings, for example, also as floor components, which hitherto was not possible. It is equally of considerable advantage that the product obtained according to the invention is not only suitable to put screws in, which applies for the products according to the state of the art as well, but can also be nailed, an additional property not present in classic concrete blocks nor in the already known types of foamed concrete.

If desired, articles obtained after a compression or vibration treatment, can be laid out to dry in a self-supporting condition, without having to keep them enclosed in moulds during drying, as applies also for the articles according to the method of European Patent Specification No. 31,365.

In the method according to the invention the compression and vibration treatment may be carried out in an apparatus of the type "Hydramat", manufactured by "Hess Maschinenfabrik KG", for compressing customary non-porous concrete blocks, the compressive force while carrying out the method according to the invention being substantially lower than the compressive force required for compressing customary concrete blocks.

The binding agent applied to the expanded plastic spheres may comprise a bituminous product or a mixture of a bituminous product with up to three times the amount of bituminous product as waterglass.

The supplement is preferably added at the end of the first mixing operation, for example as sand, said supplement accordingly replacing the part of the total amount of cement to be added in the known method, and the total amount of cement is added at once in the second step.

While maintaining addition of a part of the total amount of cement to be added at the end of the first mixing operation, the supplement in the method according to the invention may be added during transfer of the mixture from the first to the second mixing operation.

The proteinaceous foaming agent, such as available from the firm SKW at Trostberg, is also added after separate spheres have been obtained again after the first mixing operation. The total addition of proteinaceous foaming agent can amount to from 0.4 to 5% by weight, based on the total weight of solid components of the mixture in the second stage. Other protein concentrates than the one mentioned above are also suitable. As the proteinaceous concentrate is preferably added with the water added in the second mixing operation in a ratio of 1½ to 20% by weight, based on the amount of water added, it is also possible to use more diluted solutions, which accordingly are added in a larger quantity with respect to water added, but the use of concentrates is preferred as this requires transportation of a much smaller volume.

The proteinaceous foaming agent is preferably added in admixture with water, by means of a proportioning pump or proportioning syringe.

BRIEF DESCRIPTION OF THE DRAWINGS

The invention will now be elucidated in more detail by means of the accompanying drawing, which shows schematically an apparatus for performing the method according to the invention.

DETAILED DESCRIPTION OF THE PREFERRED EMBODIMENTS

In a silo 1 expanded shperes of a foam material made in a known manner, are stored. These may consist of polystyrene, for example. The spheres of foam material have a diameter of three to five mm and a specific weight of about 10 to 12 kg/m². At the lower side of the converging lower end 2 of the silo is a small rectangular discharge opening, under which a helical screw conveyor is present in a cylindrical housing 3, directly connected with said discharge opening, the conveyor being driven by an electromotor, which either as such, or of which a transmission driving gear is gradually variable in number of revolutions within a broad range of velocities from standstill, in order to drive the helical screw conveyor with a variable, accurately adjustable velocity. The helical screw conveyor emerges in a suction-duct 4 of an exhauster 5, with a blade-wheel, the blades of which being provided with rounded off front edges, allowing the spheres to pass the exhauster without being damaged. The exhauster 5 blows the spheres through a conduit 6 towards a silo 7, provided with a suitable air outlet, for example in the top, covered by a fine-meshed sieve-plate, so that the air coming from the exhauster can escape readily.

The spheres fall from silo 7 into a first compounding mill 8, consisting preferably of a trough with two horizontal shafts 9, running parallel to each other, each provided with radially extending pins 10, which are each time displaced with respect to adjacent pins, so that their free ends show a helical course around the shaft. Compounding mill 8 has, for example, a length of 4 meters and the mutual distances of the pins on each shaft are, for example, 10 cm. The pins of the two shafts overlap each other, so that in the area between the shafts a pin on one of the shafts will each time move past a pin on the other shaft when the shafts rotate in opposite directions, in such a manner that the pins move downward in the area between the shafts. The ends of the pins move very close to the wall of the trough of compounding mill 8 over a large part of their rotation cycle. The pins occupy about 3 threads around the shaft. Similar compounding mills are in essence known. A supply apparatus 11 for hot bitumen (having, for example, a temperature of about 40° C.) optionally emerges at about 90 cm from the discharge opening of silo 7, delivering a precise amount of bitumen, adjusted to the amount of spheres provided by the helical screw conveyor 3, into compounding mill 8. Then compounding takes place over a part of the path in compounding mill 8, whereafter an amount of supplemental material, for example sand or cement or a mixture of both, is brought into the compounding mill at 12 by means of a cell-wheel. Shortly before the addition of the supplement the plastic spheres tightly adhere to each other by the bitumen, to which, if desired, an amount of waterglass has been added, or to which waterglass is added simulatenously or shortly before or thereafter. The temperature is then about 40° C. After the addition of the supplement and the compounding a dry mass consisting again of loose spheres is obtained at a short distance from the start of the addition of the supplement. The spheres have a residence time of 2 to 6 minutes in compounding mill 8, only spheres with bitumen and possibly waterglass being present over about the first three meters and in addition sand, cement or a mixture thereof over about the last meter. Pins 10 on shafts 9 do not or hardly provide any conveyance themselves in the axial direction of the compounding mill 8. The conveyance in axial direction thus takes place mainly by displacement of freshly supplied material. The bitumen is added with such a viscosity that it remains sufficiently fluid to be able to flow back somewhat towards the supply-end of the spheres, so that the supply point of the bitumen is not all too critical. The supplement can not move too far upstream and thus reach spheres that have not yet become sufficiently coated with bitumen, on account of the clotting together of spheres and bitumen to larger particles, immediately upstream of the addition of the supplement.

At the discharge opening of compounding mill 8 cement is added from a hopper 15 at 14 at the beginning of a conveyor belt 16. Cell-wheels may be used at 12 and at 14. Belt 16 conveys the spheres with cement towards a second compounding mill 17, which has the same construction as compounding mill 8, but may be shorter than the latter, for example a length of 3 meters and with pins covering 2½ threads. At a short distance from the inlet, water and a proteinaceous foaming agent are added therein from belt 16 at 18, preferably divided over a number of points over the length of compounding mill 17, for example over a length of 1 meter. The water and the proteinaceous foaming agent may be added separately or together by means of a proportioning aparatus (not shown), such as a proportioning pump.

The end product leaves the compounding mill 17 at 19, where it is poured or pumped into moulds or a formwork. It is then dried in the mould or formwork, usually for about 12 to 24 hours, depending on the prevailing temperature.

Preferably expanded polystyrene spheres are used with the dimensions and density mentioned above, to which about 6 kg of bitumen or 5 kg of bitumen with 10 kg of waterglass, 50 kg of sand, 50 kg of cement, 45 kg of water and 3 kg of protein-concentrate are added per 20 kg of polystyrene foam spheres in the manner described above.

The supplement may be added at the conveyor belt instead of at 12, part of the cement then being added at 12 into the compounding mill 8.

What is claimed is:

1. A method for the manufacture of insulating, porous, shaped articles, comprising the steps of:
   mixing expanded plastic foam spheres with a binder which comprises a bituminous product which can adhere to the plastic foam spheres to cement;
   adding a granular or powdery material to the mixture of expanded plastic foam spheres and binder;
   compounding the mixture containing the granular or powdery material, the expanded plastic foam spheres and binder;
   adding a proteinaceous foaming agent to the mixture;
   adding cement to the mixture;
   adding water to the mixture;
   compounding the mixture a second time to mix in the proteinaceous foaming agent, the cement and the water;
   compressing the mixture into the desired shape of the article being manufactured; and
   drying the compressed mixture.

2. A method according to claim 1 wherein the proteinaceous foaming agent is added simultaneously with the water.

3. A method according to claim 1, wherein the foaming agent is added in an amount of 0.4 to 5% by weight based on the total weight of solid components of the final mixture.

4. A method according to claim 1 wherein polystyrene foam spheres having a diameter of 3 to 5 mm and a specific weight of 10 to 12 kg/m$^3$ are used as said foam spheres.

5. A method according to claim 4, wherein, for each 20 kg of foam spheres, about 6 kg of bitumen, is added as the binder, 50 kg of sand is added as the granular or powdery material, 50 kg of cement is added, 45 kg of water is added, and 3 kg of protein-concentrate is added as the proteinaceous material.

6. A method according to claim 2, wherein polystyrene foam spheres having a diameter of 3 to 5 mm and a specific weight of 10 to 12 kg/mm$^3$ are used as said foam spheres.

7. A method according to claim 3, wherein polystyrene foam spheres having a diameter of 3 to 5 mm and a specific weight of 10 to 12 kg/mm$^3$ are used as said foam spheres.

8. A method according to claim 4, wherein for each 20 kg of foam spheres about 5 kg of bitumen and about 25 kg of waterglass are added as the binder, 50 kg of sand are added as the granular or powdery material, 50 kg of cement are added, 45 kg of water are added, and 3 kg of protein-concentrate are added as the proteinaceous material.

* * * * *